United States Patent
Li et al.

(10) Patent No.: US 10,512,003 B2
(45) Date of Patent: *Dec. 17, 2019

(54) SUBSCRIPTION FALL-BACK IN A RADIO COMMUNICATION NETWORK

(71) Applicant: TELEFONAKTIEBOLAGET LM ERICSSON (PUBL), Stockholm (SE)

(72) Inventors: Qiang Li, Täby (SE); Justus Petersson, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,263

(22) Filed: Dec. 6, 2018

(65) Prior Publication Data

US 2019/0110228 A1    Apr. 11, 2019

Related U.S. Application Data

(63) Continuation of application No. 16/026,252, filed on Jul. 3, 2018, now Pat. No. 10,187,826, which is a continuation of application No. 15/303,186, filed as application No. PCT/SE2014/050445 on Apr. 10, 2014, now Pat. No. 10,045,260.

(51) Int. Cl.
*H04W 36/00* (2009.01)
*H04W 8/20* (2009.01)
(Continued)

(52) U.S. Cl.
CPC ....... *H04W 36/0022* (2013.01); *H04W 8/183* (2013.01); *H04W 8/20* (2013.01);
(Continued)

(58) Field of Classification Search
CPC ..... H04W 36/08; H04W 36/12; H04W 36/14; H04W 36/18; H04W 36/30; H04W 16/02;
(Continued)

(56) References Cited

U.S. PATENT DOCUMENTS 6,119,001 A * 9/2000 Delis ...................... H04W 8/06
                                                        455/408
6,957,060 B1 * 10/2005 Sharp .................... H04W 8/183
                                                        455/410
(Continued)

FOREIGN PATENT DOCUMENTS

EP          2680628 A1    1/2014
WO     2015080639 A1    6/2015

OTHER PUBLICATIONS

GSMA, Official Document 12FAST.13—Embedded SIM Remote Provisioning Architecture Version 1.1, Dec. 17, 2013.
(Continued)

*Primary Examiner* — Sharad Rampuria

(57) ABSTRACT

A method is described herein that is performed by a connectivity service platform in a communication network. The platform is enabled to communicate with a radio device via a wireless network connection of a first subscription of the radio device. The method comprises falling back to a second subscription, thereby enabling the connectivity service platform to communicate with the radio device via a wireless network connection of said second subscription of the radio device instead of the first subscription. The method also comprises receiving a request message from the radio device via the network connection of the first subscription. The method also comprises sending a reject message to the radio device, in response to the received request message and in view of the platform having fallen back to the second subscription. The reject message comprises a fall-back indication for instructing the radio device to fall back from the first subscription.

6 Claims, 5 Drawing Sheets

(51) Int. Cl.
    *H04W 76/18*     (2018.01)
    *H04W 8/18*     (2009.01)
    *H04W 88/06*     (2009.01)

(52) U.S. Cl.
    CPC ............ *H04W 76/18* (2018.02); *H04W 8/205* (2013.01); *H04W 88/06* (2013.01)

(58) Field of Classification Search
    CPC ..... H04W 16/18; H04W 16/24; H04W 24/00; H04W 24/02
    See application file for complete search history.

(56) References Cited

U.S. PATENT DOCUMENTS

| | | | |
|---|---|---|---|
| 9,596,593 B2* | 3/2017 | Li | H04W 4/70 |
| 9,723,477 B2 | 8/2017 | Li et al. | |
| 2006/0291422 A1* | 12/2006 | Rochford | H04L 63/0823 370/331 |
| 2009/0217364 A1 | 8/2009 | Salmela et al. | |
| 2017/0118679 A1 | 4/2017 | Li et al. | |

OTHER PUBLICATIONS

GSMA, Document 12ESWG7_04r10—Remote Provisioning Architecture for Embedded UICC Draft 1.39, Apr. 29, 2013.
Vodafone, et al., Large Scale Integrating Project Exalted Expanding LTE for Devices, FP7 Contract Number: 258512, WP5—Security, Authentication & Provisioning, Feb. 29, 2012.
ETSI TS 103 383 V12.2.0 Smart Cards; Embedded UICC; Requirements Specification (Release 12), Sep. 2013.
TS 102 671 CR3 V9.1.0 Smart Cards; Machine to Machine UICC; Physical and logical characteristics, ETSI TC SCP TEC Meeting #49, Sophia Antipolis, France, Sep. 9-12, 2013.

\* cited by examiner

SUBSCRIPTION FALL-BACK IN A RADIO COMMUNICATION NETWORK

CLAIM OF PRIORITY

This application is a continuation application of U.S. patent application Ser. No. 16/026,252, filed Jul. 3, 2018, now U.S. Pat. No. 10,187,826, which is a continuation of U.S. patent application Ser. No. 15/303,186, filed Oct. 10, 2016, now U.S. Pat. No. 10,045,260, which is a 371 of International Application No. PCT/SE2014/050445, filed Apr. 10, 2014. The contents of these documents are hereby incorporated by reference herein.

TECHNICAL FIELD

The present disclosure relates to methods and devices of a communication network for managing subscriptions for wireless connection of a radio device, e.g. a radio device having an embedded Universal Integrated Circuit Card (eUICC).

BACKGROUND

Unlike a traditional UICC Subscriber Identity Module (SIM) card used in a consumer device, e.g. a mobile phone, all eUICC that are deployed in e.g. Machine-to-Machine (M2M) solutions and embedded into the M2M device cannot easily be accessed by human intervention to switch the SIM card manually during the device life cycle. According to the Global System for Mobile Communications (GSM) Association (GSMA) eUICC standard (GSMA "Remote Provisioning Architecture for Embedded UICC" DRAFT 1.39 29 Apr. 2013) and European Telecommunications Standards Institute (ETSI) eUICC Standard (EXALTED "Expanding LTE for Devices" FP7 Contract Number: 258512, Feb. 29, 2012), all eUICC shall be delivered with a pre-installed provisioning subscription for remote provisioning/bootstrapping purpose (i.e. a provisioning/bootstrapping operator provides initial bootstrapping connectivity for eUICC in order to enable late binding feature i.e. to remotely provision the $1^{st}$ eUICC operational subscription to the eUICC when the device (e.g. a car) comprising the eUICC is shipped from initial manufacturer country to the destination country ($1^{st}$ operational subscription could be provided by the local operator from the destination country), and then later to change the eUICC active operational subscription from the current operator subscription to an new operator (due to the location being changed to another country, or changed operator subscription) during the device/eUICC long life cycle (15-20 years), in order to avoid high roaming fee and/or single operator lock-in situation during the device long life cycle e.g. in the automotive industry or for smart metering/security cameras etc.

However, eUICC connectivity may be lost permanently during subscription management lifecycle through operations such as enable/disable/activate/pause/deactivate/terminate/etc. In such cases the eUICC and network must fall back to an available subscription to recover the initial connectivity.

Chapter 3.5.12 "Fall-Back Mechanism" of GSMA "Remote Provisioning Architecture for Embedded UICC" DRAFT 1.39 29 Apr. 2013 states that in the event of loss of network connectivity, as detected by the device, there is a need to change to the profile with fall-back attribute set. In this case the eUICC disables the currently enabled Profile (Profile A) and enables the Profile with Fall-back Attribute set (Profile B). The device reports network loss to the eUICC. The eUICC is configured to perform the fall-back mechanism if certain network connectivity issues are reported by the Device.

SUMMARY

It has been realised that it may be difficult to fall back since the radio device may have lost network connectivity and may not have an active secondary subscription to fall back to. It can thus not contact a wireless network of another operator to set up another subscription since it does not have network connectivity.

Subscriptions of radio devices, e.g. M2M devices, may be handled via a connectivity service platform, e.g. the Ericsson Device Connection Platform (DCP) or other hosted core network (CN) or home public land mobile network (Home PLMN or HPLMN) which may be used by several different network operators to manage subscriptions for radio devices having eUICC (since the subscriptions are not handled manually by inserting a UICC card in the device). Thus, a host may host a multi-tenant home location register (HLR) and other core network nodes (Gateway General Packet Radio Service (GPRS) support node (GGSN), short message service centre (SMSC), etc.) in HPLMN as a core network service for e.g. all customer operators. All the M2M subscribers of the operators may be registered and stored on hosted HLR. Connectivity is provided as a service to all operators hosted on the platform. On top of the core network service, also a business support system (BSS), e.g. a cloud BSS, may be hosted to provision and manage subscriber data, processes, billing, etc. In accordance with the present disclosure, features for supporting i.a. eUICC are added in the connectivity service platform to meet the new developments within this field (eUICC for M2M connections from vehicles (cars), smart metering, security camera, and also for consumer electronics etc.).

According to an aspect of the present disclosure, there is provided a method performed by a connectivity service platform in a communication network. The platform is enabled to communicate with a radio device via a wireless network connection of a first subscription of the radio device. The method comprises falling back to a second subscription, thereby enabling the connectivity service platform to communicate with the radio device via a wireless network connection of said second subscription of the radio device instead of the first subscription. The method also comprises receiving a request message from the radio device via the network connection of the first subscription. The method also comprises sending a reject message to the radio device, in response to the received request message and in view of the platform having fallen back to the second subscription. The reject message comprises a fall-back indication for instructing the radio device to fall back from the first subscription.

According to another aspect of the present disclosure, there is provided a connectivity service platform for a communication network. The platform comprises processor circuitry, and storage storing instructions executable by said processor circuitry whereby said connectivity service platform is operative to be enabled to communicate with a radio device via a wireless network connection of a first subscription of the radio device. The platform is also operative to fall back to a second subscription, thereby enabling the connectivity service platform to communicate with the radio device via a wireless network connection of said second subscription of the radio device instead of the first subscription. The platform is also operative to receive a request message from the radio device via the network connection of the first subscription. The platform is also operative to send a reject message to the radio device, in response to the received request message and in view of the platform having fallen back to the second subscription. The reject message comprises a fall-back indication for instructing the radio device to fall back from the first subscription.

According to another aspect of the present disclosure, there is provided a method performed by a radio device in a communication network. The method comprises sending a request message uplink via a wireless network connection of a first subscription of the radio device. The method also comprises receiving a reject message from a connectivity service platform, in response to the sent request message. The reject message comprises a fall-back indication instructing the radio device to fall back from the first subscription. The method also comprises falling back in accordance with the received fall-back indication, to a second subscription of the radio device, thereby enabling the radio device to obtain a wireless network connection of the second subscription instead of the first subscription.

According to another aspect of the present disclosure, there is provided a radio device for a communication network. The radio device comprises processor circuitry, and storage storing instructions executable by said processor circuitry whereby said radio device is operative to send a request message uplink via a wireless network connection of a first subscription of the radio device. The radio device is also operative to receive a reject message from a connectivity service platform, in response to the sent request message. The reject message comprises a fall-back indication instructing the radio device to fall back from the first subscription. The radio device is also operative to fall back in accordance with the received fall-back indication, to a second subscription of the radio device, thereby enabling the radio device to obtain a wireless network connection of the second subscription instead of the first subscription.

According to another aspect of the present disclosure, there is provided a computer program product comprising computer-executable components for causing a connectivity service platform to perform an embodiment of a method of the present disclosure when the computer-executable components are run on processor circuitry comprised in the connectivity service platform.

According to another aspect of the present disclosure, there is provided a computer program product comprising computer-executable components for causing a radio device to perform an embodiment of a method of the present disclosure when the computer-executable components are run on processor circuitry comprised in the radio device.

According to another aspect of the present disclosure, there is provided a computer program comprising computer program code which is able to, when run on processor circuitry of a connectivity service platform, cause the connectivity service platform to be enabled to communicate with a radio device via a wireless network connection of a first subscription of the radio device. The code is also able to cause the connectivity service platform to fall back to a second subscription, thereby enabling the connectivity service platform to communicate with the radio device via a wireless network connection of said second subscription of the radio device instead of the first subscription. The code is also able to cause the connectivity service platform to receive a request message from the radio device via the network connection of the first subscription. The code is also able to cause the connectivity service platform to send a reject message to the radio device, in response to the received request message and in view of the platform having fallen back to the second subscription. The reject message comprising a fall-back indication for instructing the radio device to fall back from the first subscription.

According to another aspect of the present disclosure, there is provided a computer program comprising computer program code which is able to, when run on processor circuitry of a radio device in a communication network, cause the radio device to send a request message uplink via a wireless network connection of a first subscription of the radio device. The code is also able to cause the radio device to receive a reject message from a connectivity service platform, in response to the sent request message. The reject message comprises a fall-back indication instructing the radio device to fall back from the first subscription. The code is also able to cause the radio device to fall back in accordance with the received fall-back indication, to a second subscription of the radio device, thereby enabling the radio device to obtain a wireless network connection of the second subscription instead of the first subscription.

According to another aspect of the present disclosure, there is provided a computer program product comprising an embodiment of a computer program of the present disclosure and a computer readable means on which the computer program is stored.

By the connectivity service platform (below also called "the platform") including the fall-back indication in its reject message to the radio device, the radio device is informed that it should fall-back to its second subscription in order to regain network connectivity. The fall-back indication may e.g. comprise information about which subscription the radio device should fall back to in order to mirror the falling back already done by the platform, or comprise an indication for the radio device to follow its already stored fall-back policy which typically corresponds (or is the same as) the fall-back policy of the platform whereby the radio device can mirror the falling back of the platform to the second subscription. The platform may e.g. when it falls back, store an instruction to include the fall-back indication with a reject message if the radio device attempts to connect via the first subscription. It is also noted that there may be no need for having a synchronization mechanism between the platform and the device/UICC for synchronizing the subscription used.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
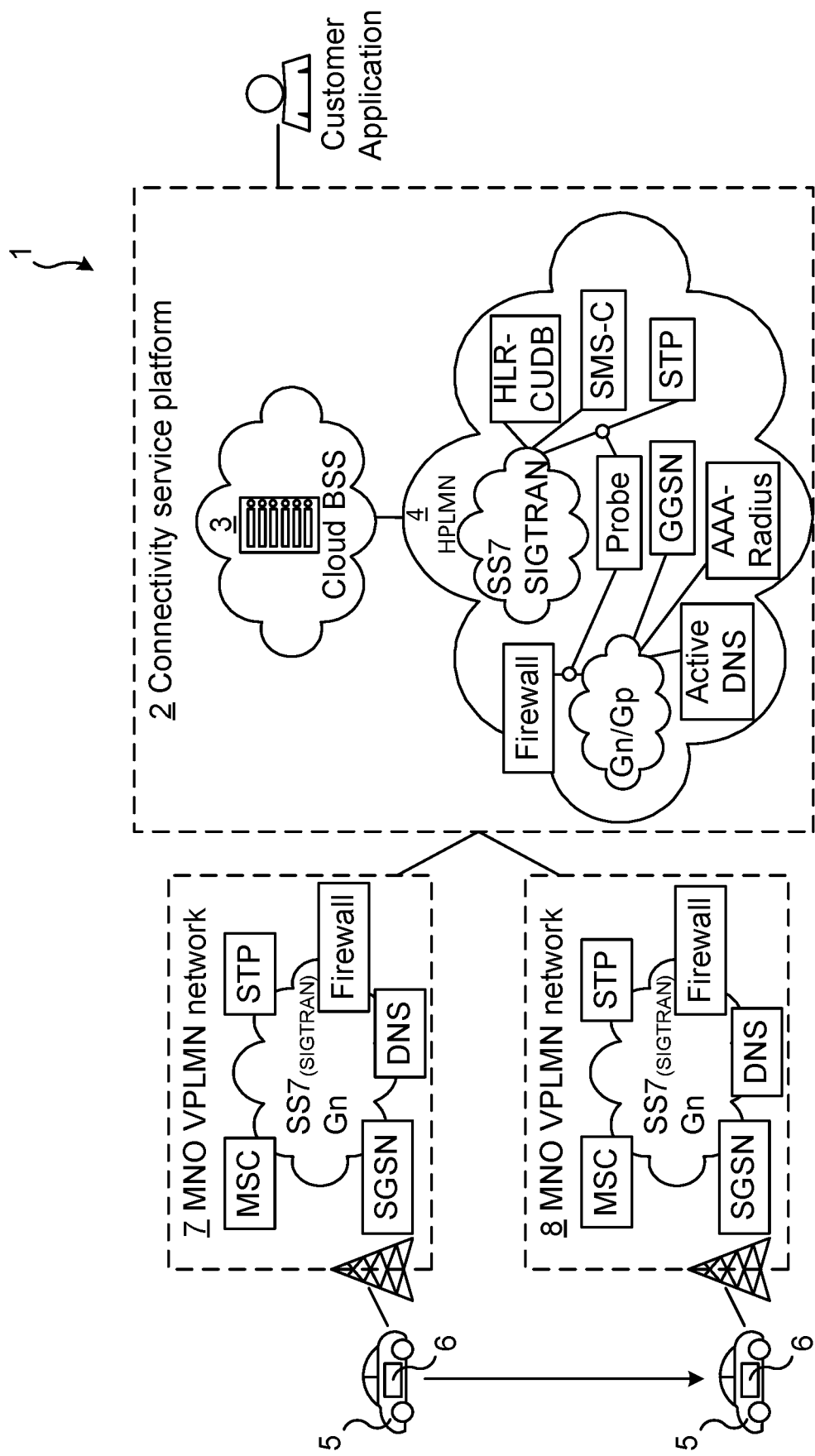
FIG. 1 is a schematic block diagram illustrating an embodiment of a communication network in accordance with the present disclosure.

FIG. 1 is a schematic block diagram illustrating an embodiment of a communication network 1 in accordance with the present disclosure. The communication network 1 comprises a connectivity service platform 2, e.g. an Ericsson Device Connection Platform (EDCP or DCP) for providing CN functionality for customers in the form of several different mobile network operators (MNO:s) for a plurality of radio devices 5 having eUICC 6, e.g. M2M devices 5. Each of the radio devices 5 may be any device or user equipment (UE), mobile or stationary, enabled to communicate over a radio cannel in a communications network, for instance but not limited to e.g. mobile phone, smart phone, modem, sensors, meters, vehicles such as cars or the like, household appliances, medical appliances, media players, cameras, or any type of consumer electronic, for instance but not limited to television, radio, lighting arrangements, tablet computer, laptop, or personal computer (PC). The connectivity service platform 2 of the embodiment of FIG. 1 comprises a cloud business support system (BSS) 3 as well as a cloud home public land mobile network (HPLMN) 4. The HPLMN 4 comprises any regular CN nodes or modules of a radio communication network, e.g. home location register (HLR), Gateway General Packet Radio Service (GPRS) support node (GGSN), short message service centre (SMSC), Signal Transfer Point (STP), Domain Name System (DNS), and authentication, authorization and accounting (AAA) RADIUS, for e.g. Signalling System 7 (SS7) and/or Integrated Services Digital Network (ISDN) communications protocols of signalling transport (SIGTRAN). The radio device 5 has a wireless connection to the network 1 and the platform 2 via a wireless connection provided by a visited PLMN (VPLMN) of a network operator 7 or 8. Each of the VPLMN also comprise the nodes and modules typical for such networks, e.g. a serving general packet radio service, GPRS, support node (SGSN), a mobile switching centre (MSC), a Domain Name System (DNS) server, a Signal Transfer Point (STP), a firewall etc. Each operator 7, 8 has a radio access network (RAN) with base stations via which radio devices may connect wirelessly provided that they have an enabled and active subscription with the operator. Since the radio device has an eUICC, the eUICC needs to be flash updated in order to change to a new subscription for its wireless connection. Instructions for the update need typically be received via its wireless connection of an old subscription before the change to the new subscription. The new subscription, may be with the same operator 7 as the old subscription, but it may more commonly be with a new operator 8. It should be noted that embodiments of the present disclosure may also be relevant for radio devices which do not have an eUICC, e.g. having a regular (removable) UICC or SIM card.

Embodiments of the present disclosure may be convenient e.g. in cases where the network side, i.e. the platform 2 has implemented a fall-back mechanism or otherwise has changed its subscription for the radio device 5 but where the radio device 5 still uses the old subscription, i.e. has not fallen back to the subscription which is active in the platform 2.

In an example, the network side (platform 2) has performed fall-back from the current MNO 7 IMSI to the MNO 8 provisioning IMSI, and shall store a fall-back message which indicates that the specific eUICC(ID) of the radio device 5 has changed active subscription from MNO 7 IMSI to the MNO 8 provisioning IMSI, and then when the network side receives a e.g. attach request message (with the current MNO 7 IMSI) from the radio device 5, e.g. from the eUICC 6, it shall notify the device/eUICC the fall-back message/indication through the attach reject message. The radio device 5 receives the attach reject message and analyses the fall-back indication, and shall then execute the subscription change from current MNO 7 IMSI to the MNO 8 provisioning (fall-back) IMSI, so that the device 5/eUICC 6 can use the provisioning (fall-back) IMSI to reattach to the network/platform 2. Thereby the fall-back can be done successfully for both device/eUICC and the network/platform. Here it is assumed that the provisioning subscription is the fall-back subscription used for fall-back purpose. However, if there are other available subscriptions (operational subscription) existing on both device/eUICC and network/platform (DCP) that has a fall-back attribute enabled, it is alternatively possible to fall-back to that subscription.

Figure 2:
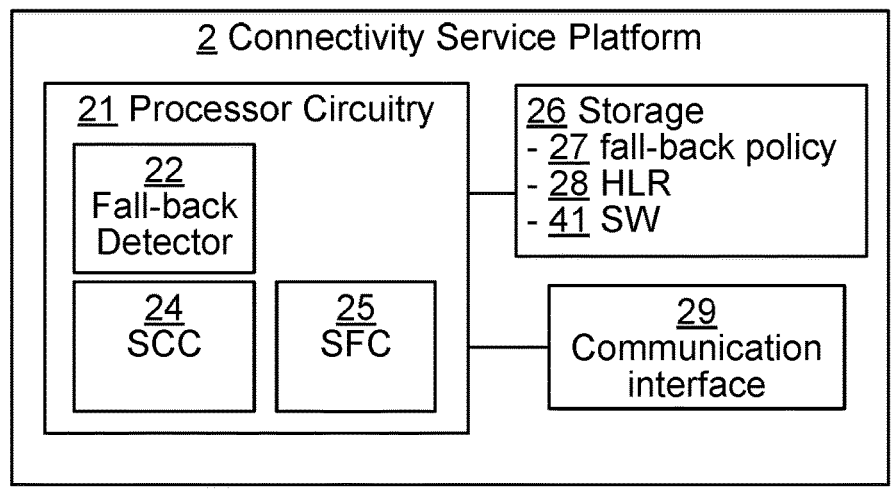
FIG. 2 is a schematic block diagram of an embodiment of a connectivity service platform of the present disclosure.

FIG. 2 is a schematic block diagram of an embodiment of a connectivity service platform 2 of the present disclosure. The platform 2 comprises processor circuitry 21 e.g. a central processing unit (CPU). The processor circuitry 21 may comprise one or a plurality of processing units in the form of microprocessor(s). However, other suitable devices with computing capabilities could be comprised in the processor 21, e.g. an application specific integrated circuit (ASIC), a field programmable gate array (FPGA) or a complex programmable logic device (CPLD). The processor circuitry 21 is configured to run one or several computer program(s) or software (SW) 41 stored in a storage 26 e.g. comprising a memory. The processor circuitry comprises one or several modules 22, 24 and 25 as a result of executing SW 41 in the storage 26, e.g. the fall-back detector 22, a subscription change component (SCC) 24 and/or a subscription fall-back component (SFC) 25 which is below, in FIG. 8, as an example depicted as comprising the fall-back event detector 22 as well as the executed fall-back policy 27. Each of these modules may be formed by separate or dedicated processors of the processor circuitry 21 or by a common processor. The storage 26 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the HLR 28 as well as the fall-back policy 27 is part of/stored in the storage 26. The processor circuitry 21 is also configured to store data in the storage 26, as needed. The platform 2 also comprises a communication interface 29 for communication with the radio device 5 as well as with other parts of the communication network 1 such as the operators 7 and 8. The communication interface may comprise a transmitter and a receiver for, in cooperation with the processor circuitry 21, sending and receiving data messages and other digital signalling.

Figure 3:
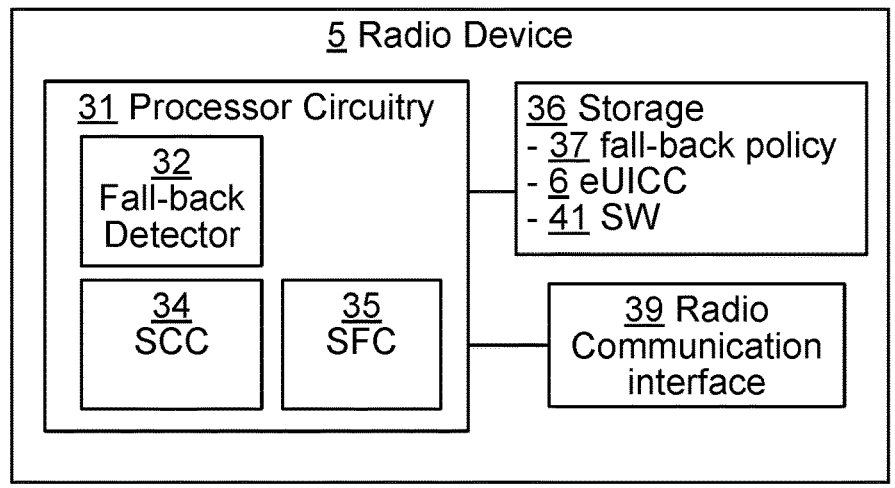
FIG. 3 is a schematic block diagram of an embodiment of a radio device of the present disclosure.

FIG. 3 is a schematic block diagram of an embodiment of a radio device 5 of the present disclosure. The radio device 5 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 41 stored in a storage 36 e.g. comprising a memory. The processor circuitry comprises one or several modules 32, 34 and 35 as a result of executing SW 41 in the storage 36, e.g. the fall-back detector 32, a subscription change component (SCC) 34 and/or a subscription fall-back component (SFC) 35 which is below, in FIG. 8, as an example depicted as comprising the fall-back event detector 32 as well as the executed fall-back policy 37. Each of these modules may be formed by separate or dedicated processors of the processor circuitry 31 or by a common processor. The storage 36 may comprise one or several storage units, of one or several type(s), each of which can be regarded as a computer readable means as discussed herein and may e.g. be in the form of a Random Access Memory (RAM), a Flash memory or other solid state memory, or a hard disk, or be a combination thereof. Also the eUICC 6 of the device 5 as well as the fall-back policy 37 is part of/stored in the storage 36. The processor circuitry 31 is also configured to store data in the storage 36, as needed. The radio device 5 also comprises a radio communication interface 39 for communication with the platform 2 as well as with other parts of the communication network 1 such as the operators 7 and 8. The communication interface may comprise a transmitter and a receiver, as well as an antenna, for, in cooperation with the processor circuitry 31, sending and receiving data messages and other digital signalling wirelessly.

Figure 4:
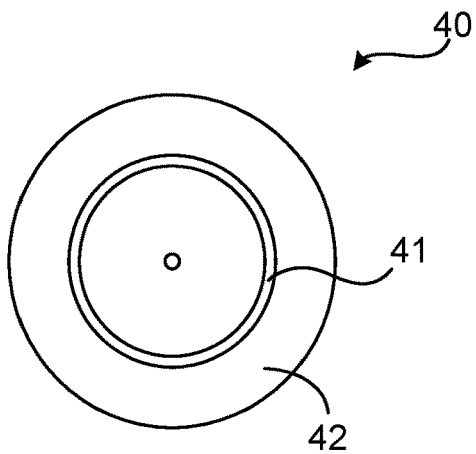
FIG. 4 is a schematic illustration of an embodiment of a computer program product of the present disclosure.

FIG. 4 illustrates a computer program product 40. The computer program product 40 comprises a computer readable medium 42 comprising a computer program 41 in the form of computer-executable components 41. The computer program/computer-executable components 41 may be configured to cause the platform 2 or the radio device 5 as discussed herein to perform an embodiment of a method of the present disclosure. The computer program/computer-executable components may be run on the processor circuitry 21 of the platform 2 or the processor circuitry 31 of the radio device 5 for causing the platform/radio device to perform the method. The computer program product 40 may e.g. be comprised in a storage 26 or 36 comprised in the platform/radio device and associated with the processor circuitry 21 or 31. Alternatively, the computer program product 40 may be, or be part of, a separate, e.g. mobile, storage means, such as a computer readable disc, e.g. CD or DVD or hard disc/drive, or a solid state storage medium, e.g. a RAM or Flash memory.

Figure 5A:
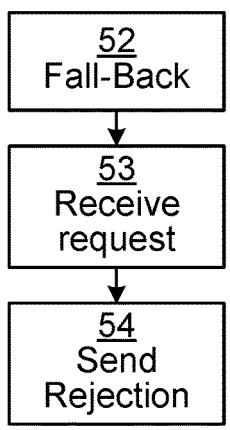
FIG. 5a is a schematic flow chart of an embodiment of a method of a connectivity service platform, of the present disclosure.

FIG. 5a is a flow chart illustrating an embodiment of a method of the present disclosure. The method is performed by a connectivity service platform 2 in a communication network 1. The platform 2 is enabled to communicate with a radio device 5 via a wireless network connection of a first subscription of the radio device. Then, for some reason, the platform 2 decides to fall back 52 to a second subscription, thereby enabling the connectivity service platform 2 to communicate with the radio device 5 via a wireless network connection of said second subscription of the radio device instead of the first subscription. For instance, the fall-back may triggered by a fall-back function in the BSS 3, and the BSS may notify the HLR 28 to fall-back to the second subscription, so both BSS 3 and HLR 28 will activate the second subscription, which means the device 5 (with the relevant eUICC ID) will be allowed network access via the second subscription. However, the radio device 5 may not yet be enabled to communicate by means of its second subscription. Rather, the platform 2 receives 53 a request message from the radio device 5 via the network connection of the first subscription, i.e. the subscription which is no longer active in the platform 2. In response to the received 53 request message, the platform 2 sends 54 a reject message to the radio device 5. In view of the platform 2 having fallen back 52 to the second subscription, the reject message comprises a fall-back indication for instructing the radio device to fall back from the first subscription. The fall-back indication is configured to be interpreted by the radio device as a direct instruction to change subscription from the first (current) subscription for activating the second subscription instead to enable communication between the radio device and the network side by means of the second subscription instead of the first subscription.

Figure 5B:
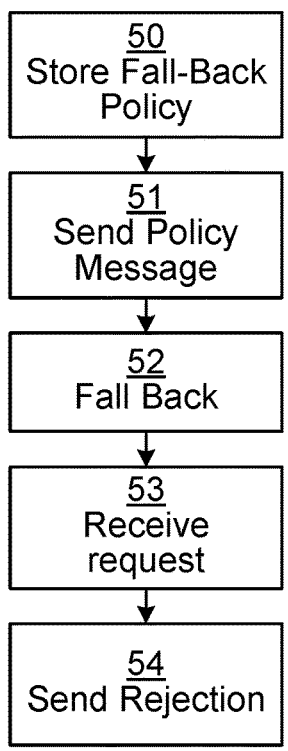
FIG. 5b is a schematic flow chart of another embodiment of a method of a connectivity service platform, of the present disclosure.

FIG. 5b is a schematic flow chart of another embodiment of a method of the connectivity service platform 2, of the present disclosure. The steps of falling back 52, receiving 53 a request message, and sending 54 a reject message are as discussed in relation to FIG. 5a. Further, the platform 2 may in some embodiments, prior to the falling back 52, store 5o a fall-back policy 27, and possibly also send 51 a policy message comprising information about the stored 50 fall-back policy 27 to the radio device 5. Thereby, the radio device 5 may be informed of the fall-back policy 27 used by the platform 2, e.g. which subscription will be used by the platform in case of fall back 52, allowing the radio device 5 to use this information for choosing to fall back to the same subscription in case it receives a fall-back indication as part of a reject message. The fall-back policy 27 may be predetermined and received by the platform 2 from outside of the platform, and then stored in the platform. The fall-back policy may be specific for the individual radio device 5 or eUICC 6.

Figure 6A:
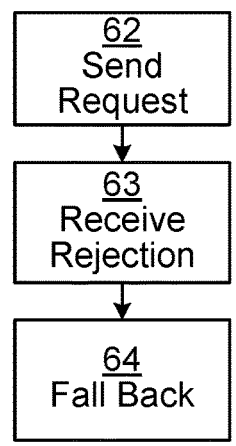
FIG. 6a is a schematic flow chart of an embodiment of a method of a radio device, of the present disclosure.

FIG. 6a is a schematic flow chart of an embodiment of a method of the radio device 5, of the present disclosure. The radio device 5 sends 62 a request message uplink via a wireless network connection of a first subscription of the radio device 5. This request message is typically received by a platform 2 as discussed herein. Then, the radio device 5 receives 63 a reject message from the connectivity service platform 2, in response to the sent 62 request message. As also discussed in relation to the method performed by the platform 2, the reject message comprises a fall-back indication instructing the radio device 5 to fall back from the first subscription. As a consequence of the received fall-back indicator, the radio device falls back 64 in accordance with the received 63 fall-back indication, to a second subscription of the radio device, thereby enabling the radio device 5 to obtain a wireless network connection of the second subscription instead of the first subscription. Provided that the fall-back is successful and both the platform 2 and the radio device 5 have activated the second subscription, the wireless network connection of the second subscription can be set up.

Figure 6B:
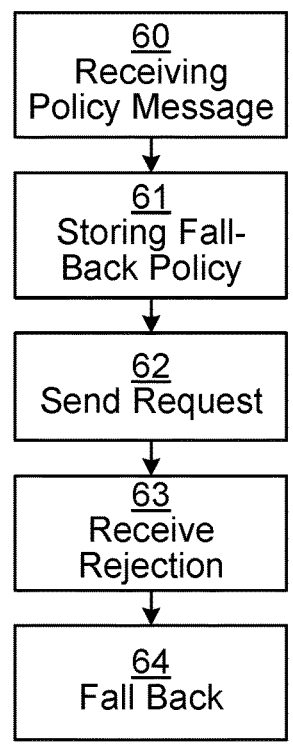
FIG. 6b is a schematic flow chart of another embodiment of a method of a radio device, of the present disclosure.

FIG. 6b is a schematic flow chart of another embodiment of a method of the radio device 5, of the present disclosure. The steps of sending 62 a request message, receiving 63 a reject message, and falling back 64 are as discussed in relation to FIG. 6a.

Further, the method of the radio device may comprise, typically prior to the sending 62 of the request message, receiving 60 a policy message e.g. from the platform 2 or from another network node, comprising information about a platform fall-back policy 27, i.e. the fall-back policy of the platform 2. The radio device may then store 61 a device fall-back policy 37 based on said received 60 policy message. Typically, the device fall-back policy is the same as, or otherwise corresponds to, the platform fall-back policy 27, e.g. "in case of fall-back, change subscription to (a specified) fall-back subscription". If the respective fall-back policies prompt both the device and the platform to fall back to the same subscription, the fall-back may be successful. When the radio device 5 has a stored device fall-back policy 37, the received fall-back indication may instruct the radio device 5 to activate the stored fall-back policy 37, whereby the falling back 64 may be in accordance with the stored fall-back policy.

Figure 7:
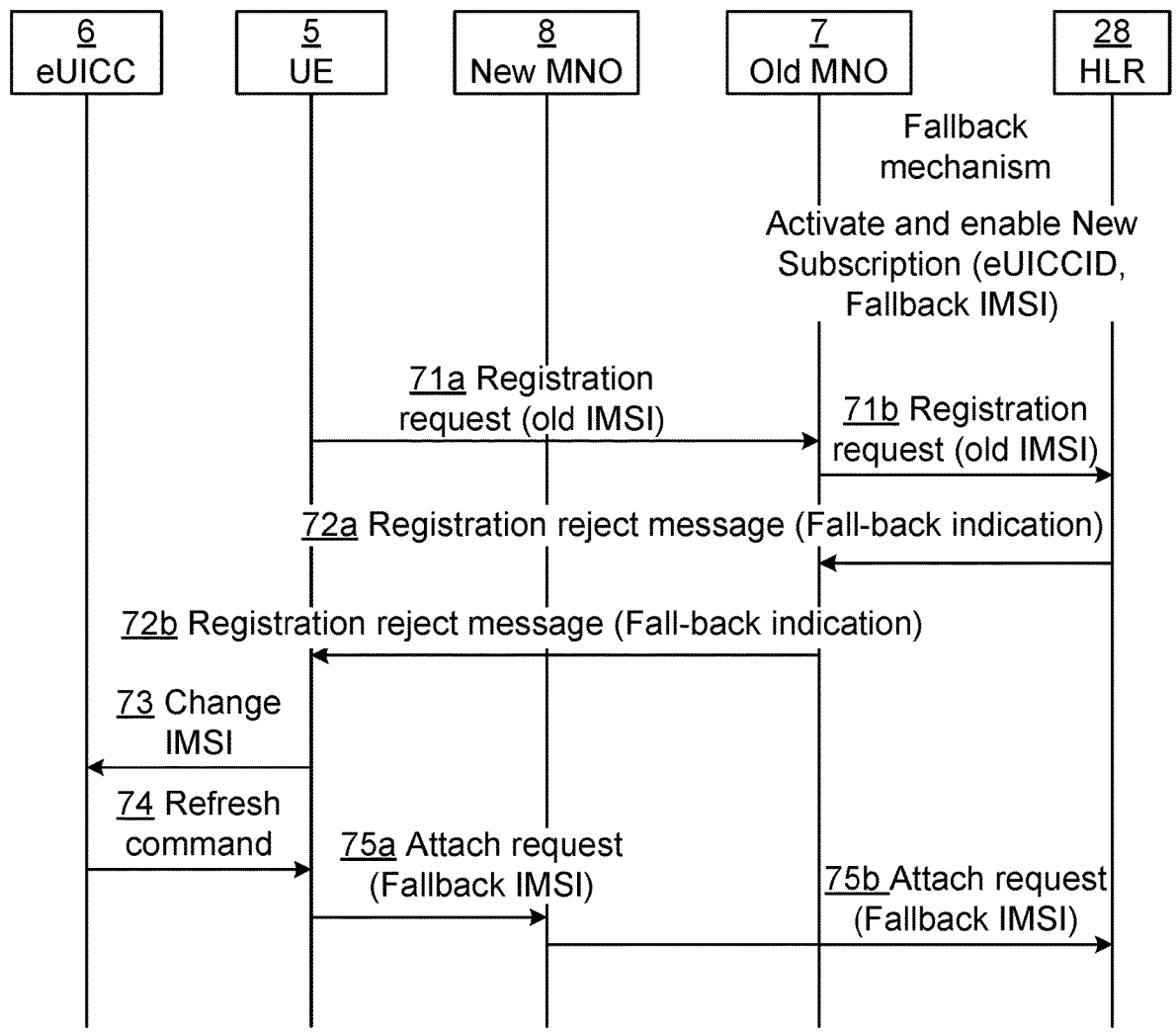
FIG. 7 is a schematic signalling diagram illustrating embodiments of the present disclosure.

FIG. 7 is a schematic signalling diagram illustrating embodiments of the present disclosure. The platform 2, comprising the HLR 28, has fallen back from the first subscription to the fall-back (second) subscription with a fall-back IMSI for the eUICC 6 identifier (ID) of the radio device 5 (here called User Equipment, UE). The UE 5 sends 62 the request message 71 (here exemplified with a registration request) using the old IMSI i.e. of the first subscription. The request message 71a is received by the old MNO 7 and forwarded (message 71b) to the HLR 28 of the platform 2. However, the old IMSI is no longer active in the platform 2, but there is information stored therein, for that IMSI or other identifier of the radio device 5, instructing the platform to send a fall-back indication to the radio device 5. Thus, the platform 2 sends 54 the reject message 72 (herein a registration reject message) comprising the fall-back indication. Again, the message (as message 72a) is received by the old MNO 7 and forwarded (message 72b) to the radio device 5. Having received 63 the reject message 72, the radio device instructs (signal 73) its eUICC 6 to change IMSI from the current first subscription to the fall-back second subscription, i.e. to fall back 64. The eUICC responds with a refresh command 74, where after the radio device 5 may send a new attach request 75 using the fallback IMSI of the second subscription.

In some embodiments of the present disclosure, the fall-back indication is configured for instructing the radio device 5 to activate a fall-back policy 37 stored in the radio device. Thus, the second subscription need not be specifically identified by the fall-back indication, since the fall-back policy 37 specifies which subscription to fall back to, i.e. the second subscription.

In some other embodiments, the fall-back indication identifies the second subscription and is configured for instructing the radio device 5 to fall back to said second subscription. In this case, no stored device fall-back policy may be needed.

In some embodiments of the present disclosure, the falling back 52 comprises storing instructions for sending the reject message 72 comprising the fall-back indication in response to receiving the request message 71 from the radio device 5. The BSS 3 may thus instruct the HLR to store the instructions in order for the fall-back indication to be sent to the radio device 5 if it tries to use the first subscription. Thus, in some embodiments, the instructions for sending the reject message 72 are stored in an HLR 28 in the platform 2, e.g. by a business support system (BSS) 3 in the platform 2. However, in some other embodiments, the instructions for sending the reject message 72 are stored in a serving general packet radio service (GPRS) support node, SGSN, in the platform 2, e.g. by the HLR 28 or the BSS 3 via the HLR 28 in the platform 2. It may be convenient to store the information in the SGSN because it is also possible for HLR to send this instructions further to SGSN, so that SGSN can respond with the fall-back indication via the reject message directly to the devices, when SGSN receives the request message 71 from the device 5. In that case there is no need to talk to HLR 28. To be more concrete, authentication request/attach/location update request etc (examples of request messages 71) are handled (rejected) by HLR 28, while mobile originated (MO) short message service (SMS) request, packet data protocol (PDP) request, etc (other examples of request messages 71) can be handled (rejected) by SGSN directly, without need to involve the HLR 28. In some embodiments, the falling back 52 comprises removing the stored instructions after having sent 54 the reject message 72. For instance, the fall-back indication may be removed from the platform 2, e.g. the HLR 28 and/or SGSN after the platform 2 has received a request message (e.g. a an attach request) from the radio device 5 using the second subscription, indicating that the device 5 has successfully changed to the second subscription and attaches to the network HLR/SGSN via said second subscription.

In some embodiments of the present disclosure, the request message 71 is a registration request for registering, or an attach request for attaching, or a location update request for updating the location of, or an authentication request for authenticating, or a short message service (SMS) request from, or a packet data protocol (PDP) context create or activation request from, the radio device via the first subscription.

In some embodiments of the present disclosure, the reject message 72 is a signalling reject message or a traffic reject message, or any other suitable reject message for embodiments of the request messages 71 discussed herein, which has been modified to include a failure code comprising the fall-back indication.

In some embodiments of the present disclosure, the platform 2 is enabled to communicate with the radio device 5 comprising an embedded Universal Integrated Circuit Card (eUICC) 6. However, also radio devices with other UICC or subscriber identity module (SIM) card or element may be used with embodiments of the present disclosure.

EXAMPLE

Figure 8:
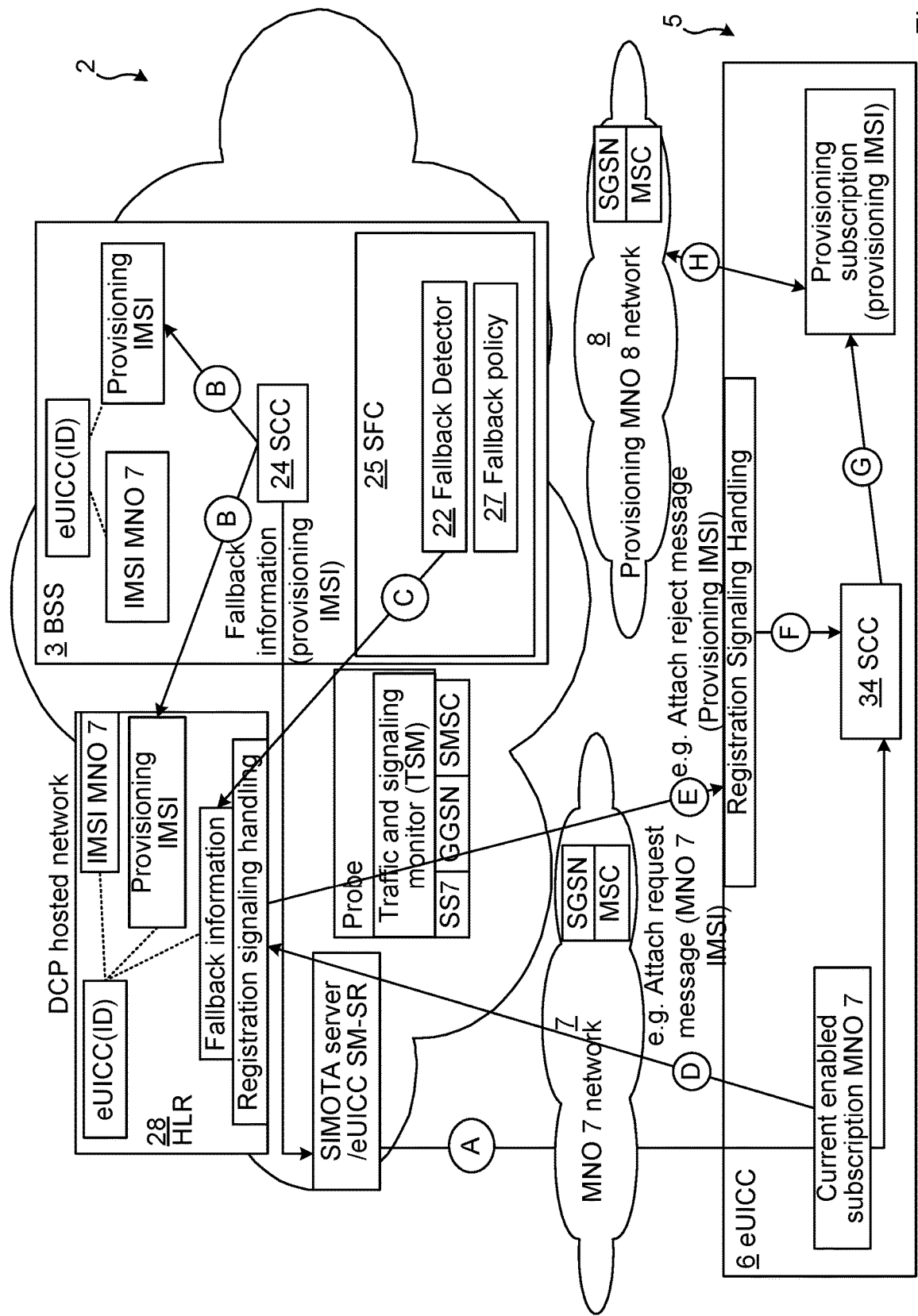
FIG. 8 is a schematic block diagram illustrating example embodiments of the present disclosure.

Reference is made to FIG. 8. The premise for this proposed example is that both the radio device 5 and the platform 2 have enabled, and are possible communicating by means of, the first subscription of MNO 7.

Step A—Network side (BSS 3, HLR 28) detects a network connectivity failure.

Step B—Network side executes its Fall-back policy 27. In the case of network connectivity failure, BSS Subscription Fall-back Component (SFC) 25 determines to fall-back 52 to e.g. provisioning subscription (IMSI). Both BSS 3 and HLR 28 enable the provisioning (second) subscription, and disable the current (first) subscription of MNO 7.

Step C—BSS Subscription Fallback Component (SFC) 25 sends a fall-back message to HLR, the fall-back message indicates that the specific eUICC(ID) has changed active subscription from MNO 7 IMSI to provisioning subscription (MNO 8 IMSI), and that the device 5/eUICC 6 shall re-attach to the network using the second subscription (IMSI), instead of the first subscription IMSI.

Step D—If no fall-back policy 37 has been implemented on the device 5/eUICC 6, the device/eUICC still tries to attach to the network by using the old MNO 7 IMSI. The request message 71 (incl. authentication request, location update request, etc) of the MNO 7 IMSI is received 53 by platform 2 HLR 28 registration signaling handler.

Step E—The HLR registration signaling handler recognizes that the MNO 7 IMSI is in deactivated state or even not provisioned in the HLR 28. However, it also recognizes that there is fall-back information stored for this IMSI and eUICC(ID), which indicates that the eUICC(ID) has changed active subscription from MNO 7 IMSI to the MNO 8 provisioning IMSI. HLR registration signaling handler shall thus respond with the attach reject message comprising the fall-back indicator.

Step F—The device/eUICC registration signaling handler receives 63 the attach reject message including the fall-back indictor. It shall analyze the fall-back indicator, and then notifies the eUICC Subscription change component (SCC) 34 to enable and activate the MNO 8 provisioning subscription (IMSI), and disable the MNO 7 IMSI in the eUICC 6.

Step G—eUICC 6 shall then enable and activate the MNO 8 provisioning subscription, and disable and deactivate the current subscription of MNO 7. eUICC 6 shall notify the radio device 5 to do a refresh command 74 in order to trigger the reattach request to the network.

Step H—The device 5/eUICC 6 reattaches to the network by sending the registration request 75 using the new (provisioning) IMSI, instead of the old MNO 7 IMSI. The new (provisioning subscription) IMSI is now active on both network side and eUICC side, therefore the eUICC 6 can recover the connectivity successfully with the provisioning IMSI, and the fall-back is successful.

Below follow some other aspects of the present disclosure.

According to an aspect of the present disclosure, there is provided a connectivity service platform 2 for a communication network 1. The platform comprises means (e.g. the processor circuitry 21 in cooperation with the communication interface 29) for being enabled to communicate with a radio device 5 via a wireless network connection of a first subscription of the radio device. The platform 2 also comprises means (e.g. the processor circuitry 21, such as the fall-back detector 22 (possibly of the SFC 25) and/or the SCC 24) for falling back 52 to a second subscription, thereby enabling the connectivity service platform 2 to communicate with the radio device 5 via a wireless network connection of said second subscription of the radio device instead of the first subscription. The platform 2 also comprises means (e.g. the processor circuitry 21 in cooperation with the communication interface 29) for receiving 53 a request message 71 from the radio device 5 via the network connection of the first subscription. The platform 2 also comprises means (e.g. the processor circuitry 21 in cooperation with the communication interface 29) for sending 54 a reject message 72 to the radio device 5, in response to the received 53 request message 71 and in view of the platform 2 having fallen back 52 to the second subscription. The reject message 72 comprises a fall-back indication (e.g. from the storage 26, such as the HLR 28) for instructing the radio device to fall back from the first subscription.

According to another aspect of the present disclosure, there is provided a radio device 5 for a communication network 1. The radio device comprises means (e.g. the processor circuitry 31 in cooperation with the radio communication interface 39) for sending 62 a request message 71 uplink via a wireless network connection of a first subscription of the radio device 5. The radio device also comprises means (e.g. the processor circuitry 31 in cooperation with the radio communication interface 39) for receiving 63 a reject message 72 from a connectivity service platform 2, in response to the sent 62 request message 71. The reject message comprises a fall-back indication instructing the radio device 5 to fall back from the first subscription. The radio device also comprises means (e.g. the processor circuitry 31, such as the fall-back detector 32 (possibly of the SFC 35) and/or the SCC 34) for falling back 64 in accordance with the received 63 fall-back indication, to a second subscription of the radio device, thereby enabling the radio device 5 to obtain a wireless network connection of the second subscription instead of the first subscription.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed by a card in a radio device, wherein the radio device is performing a fall back step in a communication network from a first subscription to a second subscription, the method comprising steps of:
   receiving, from the radio device, instructions to change an old International Mobile Subscriber Identity (IMSI) from the first subscription to a new IMSI for the second subscription; and,
   sending, to the radio device, a refresh command,
   wherein the first subscription is with a first Mobile Network Operator (MNO) and
   the second subscription is with a second Mobile Network Operator (MNO).

2. The method of claim 1, wherein the card is:
   an embedded Universal Integrated Circuit Card (eUICC);
   a removable Universal Integrated Circuit Card (UICC); or
   a Subscriber Identity Module (SIM) card.

3. A method performed by a card in a radio device, wherein the radio device is performing a fall back step in a communication network from a first subscription to a second subscription, the method comprising steps of:
   receiving, from the radio device, instructions to change an old International Mobile Subscriber Identity (IMSI) from the first subscription to a new IMSI for the second subscription; and,
   sending, to the radio device, a refresh command,
   wherein the first subscription and the second subscription are with a same Mobile Network Operator (MNO).

4. A card in a radio device, wherein the radio device is performing a fall back operation in a communication network from a first subscription to a second subscription, the card is configured to:
  receive, from the radio device, instructions to change an old International Mobile Subscriber Identity (IMSI) from the first subscription to a new IMSI for the second subscription; and,
  send, to the radio device, a refresh command,
  wherein the first subscription is with a first Mobile Network Operator (MNO) and the second subscription is with a second Mobile Network Operator (MNO).

5. The card of claim 4, wherein the card is:
  an embedded Universal Integrated Circuit Card (eUICC);
  a removable Universal Integrated Circuit Card (UICC); or
  a Subscriber Identity Module (SIM) card.

6. A card in a radio device, wherein the radio device is performing a fall back operation in a communication network from a first subscription to a second subscription, the card is configured to:
  receive, from the radio device, instructions to change an old International Mobile Subscriber Identity (IMSI) from the first subscription to a new IMSI for the second subscription; and,
  send, to the radio device, a refresh command,
  wherein the first subscription and the second subscription are with a same Mobile Network Operator (MNO).

* * * * *